H. W. SEAVEY.
Horse Hay-Fork.
No. 216,225. Patented June 3, 1879.
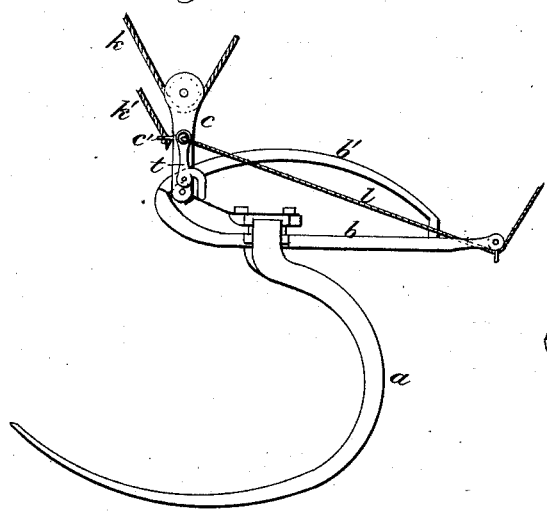
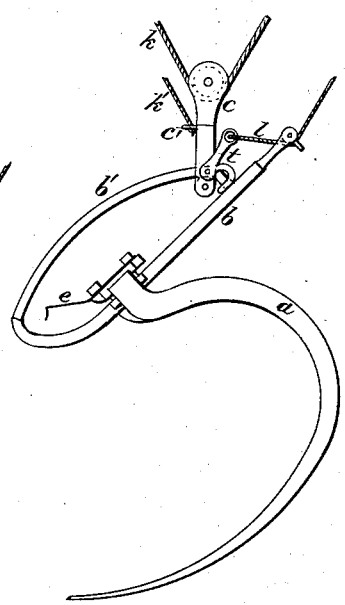
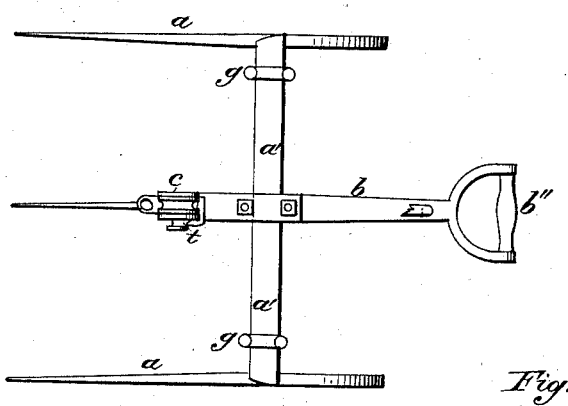
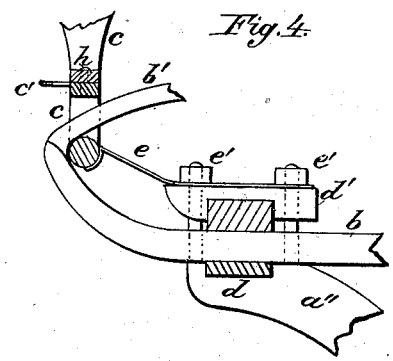
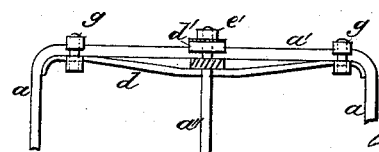

UNITED STATES PATENT OFFICE.

HANSON W. SEAVEY, OF PORTSMOUTH, NEW HAMPSHIRE.

IMPROVEMENT IN HORSE HAY-FORKS.

Specification forming part of Letters Patent No. 216,225, dated June 3, 1879; application filed May 6, 1879.

*To all whom it may concern:*

Be it known that I, HANSON W. SEAVEY, of Portsmouth, in the county of Rockingham and State of New Hampshire, have invented certain new and useful Improvements in Horse Hay-Forks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improvement in that class of agricultural implements usually called "horse hay-forks," the object being to so construct the implement that it may be easily loaded, and shall be capable of quickly discharging its load freely and fully when desired; and, further, by the use of a truss-brace, to so connect and stiffen the parts that a fork of less weight will have equal strength with one much heavier made in the usual manner; and the invention consists in the construction and arrangement of the several parts of the fork and its operating mechanism, as will be hereinafter fully described, and then specifically set forth in the claims.

In the drawings, Figure 1 is a side view of the fork in the position it occupies when loaded. Fig. 2 is also a side view with the fork in the position it assumes when discharging its load. Fig. 3 is a plan, showing the relative positions of the tines, shank, and other parts of the implement. Fig. 4 is an enlarged side view, partly in section, of the shank and device which holds the swivel-pulley in place while the fork is loaded. Fig. 5 is a transverse sectional view, showing the construction of the truss which supports and stiffens the cross-piece.

The two outside tines, $a\ a$, of the fork, together with the cross-piece $a'$, which connects them, are formed from a single piece of steel of a section equal to that of the cross-piece, its two ends being drawn out and bent to the proper form. Attached to this piece $a'$, at right angles, near its middle, is the shank $b$, one end of which, $b'$, is reduced to a circular cross-section, bent over in the form of an arch, and connected to the shank $b$ by riveting or welding thereto near its outer extremity, thus forming a traveler, upon which the swivel-pulley $c$ moves freely in operating the fork. The other end of the shank $b$ is bifurcated, and carries in the fork a handle, $b''$, by which the implement is manipulated when thrusting it into the hay in loading it.

The middle tine, $a''$, of the fork is formed with a bifurcated end, the two parts of which embrace the cross-piece $a'$ and truss $d$, passing through the shank $b$, a keeper, $d'$, and stop-spring $e$, and are then secured by the nuts $e'$, which, when screwed up, hold all the parts named firmly together in their relative positions. The two ends of the truss $d$ are also firmly secured to the cross-piece $a'$ by the clips $g\ g$, which embrace both the truss and cross-piece.

It will be apparent that when these several parts are placed in their proper position with relation to each other, and the nuts screwed up, a very strong and light fork is the result, as the cross-piece $a'$ is fully supported by the truss, and the middle tine by its method of connection to truss, cross-piece, and shank. The pulley $c$, formed in two parts, is connected by a pivot, $h$, the lower part of the pulley embracing the traveler, and the upper part carrying the rope $k$, by which the fork is elevated. The fork is brought over the hay to be moved while in the position shown in Fig. 2; but after it has been thrust into the hay the swivel-pulleys are moved forward upon the traveler, into the position shown in Fig. 1, either by hand or by means of the rope $k'$, attached to a loop, $c'$, formed upon the upper part of the swivel-pulley $c$. This brings the lower part of the pulley forward, so that it is caught by the curved end of the spring $e$, and held firmly in that position, so that when the fork is elevated by the rope $k$ the points of its tines are the first to rise, thus preventing any escape of the load.

Pivoted to the lower part of the pulley $c$ is the trigger $t$, its lower end bent at right angles and resting on the top of the spring $e$. To the upper end of the trigger is secured one end of the trigger-line $l$, which passes through a loop on the under side of the handle, and thence to any desired position. When the fork with its load has reached the place where the load is to be deposited, a pull upon the trigger-line forces down the spring $e$, and allows the pulley $c$ to run to the opposite end of the traveler, thus lowering the points of the tines and allowing the fork to drop its load.

It will be observed that the swiveling pulley allows the fork to be turned as may be necessary without twisting or kinking the elevating-rope $k$, thus rendering the implement much more convenient in use than a fork which must always take its load in one direction.

Having thus described my invention, I claim as new, and desire to secure by Letters Patent, the following.

1. In an implement constructed for the purpose described, the combination of the shank $b$, arched traveler $b'$, spring-catch $e$, and swivel-pulley $c$, provided with trigger $t$, as and for the purpose set forth.

2. The combination of the tines $a\ a$, connected by cross-piece $a'$, tine $a''$, and truss $d$ and clips $g$, all arranged substantially as and for the purpose set forth.

3. The tines $a\ a$, cross-piece $a'$, bifurcated tine $a''$, and shank $b$, in combination with the truss $d$ and keeper $d'$, arranged in the manner and for the purpose specified.

In testimony that I claim the foregoing I have hereunto set my hand this 6th day of May, 1879.

HANSON W. SEAVEY.

Witnesses:
E. A. DICK,
F. H. SCHOTT.